Aug. 2, 1966　　　　　F. W. PREUSS　　　　　3,264,046
APPLIANCE SUPPORTING CABINET
Filed Oct. 31, 1963　　　　　　　　　　　6 Sheets-Sheet 1
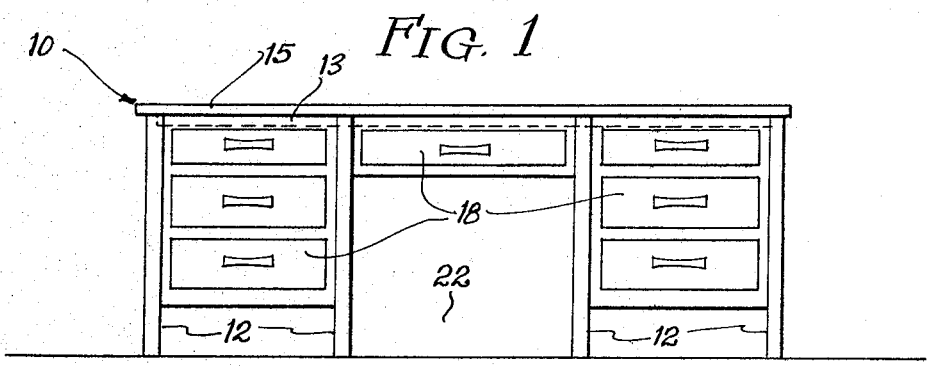
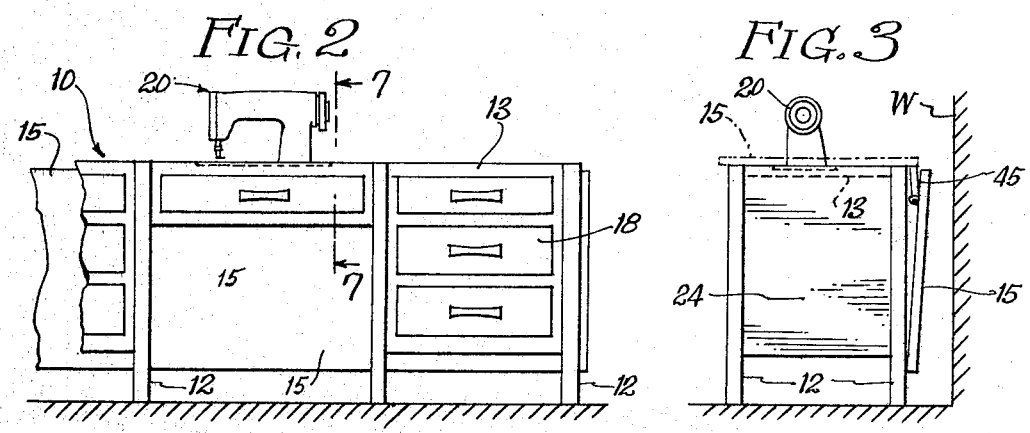 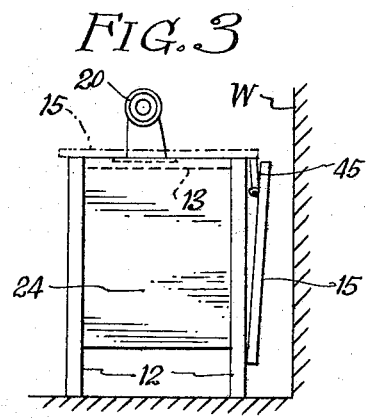
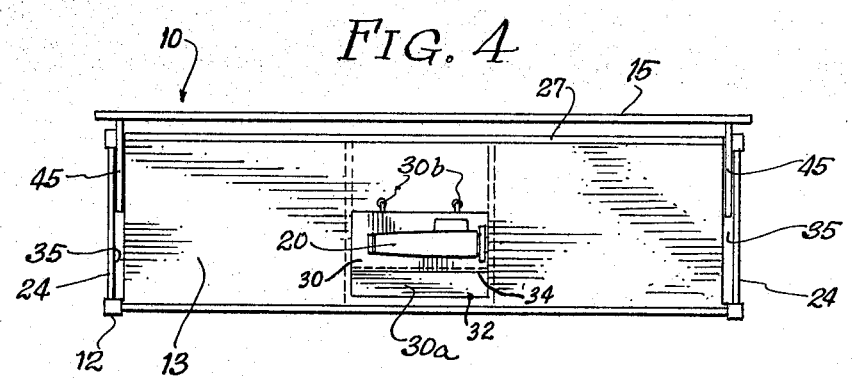
INVENTOR.
Frederick W. Preuss
BY
Atty's

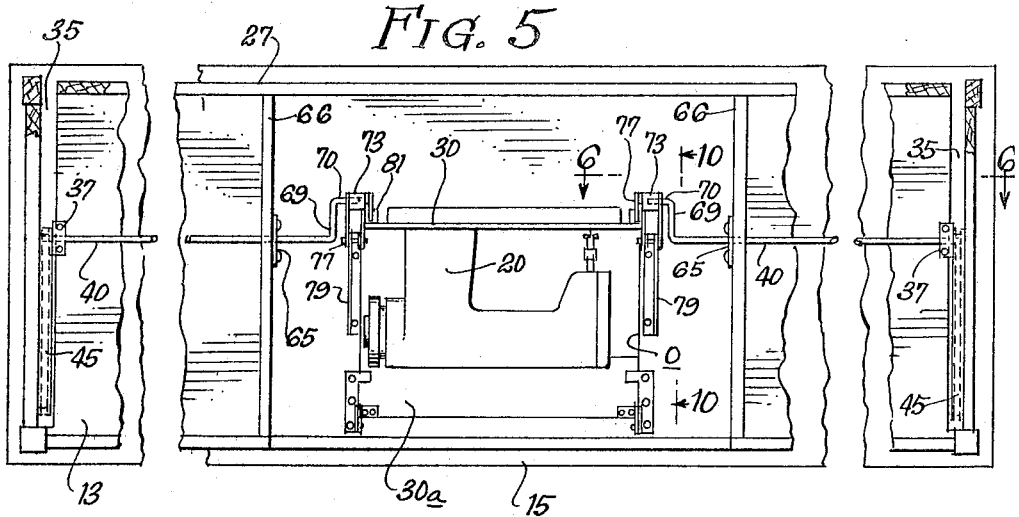
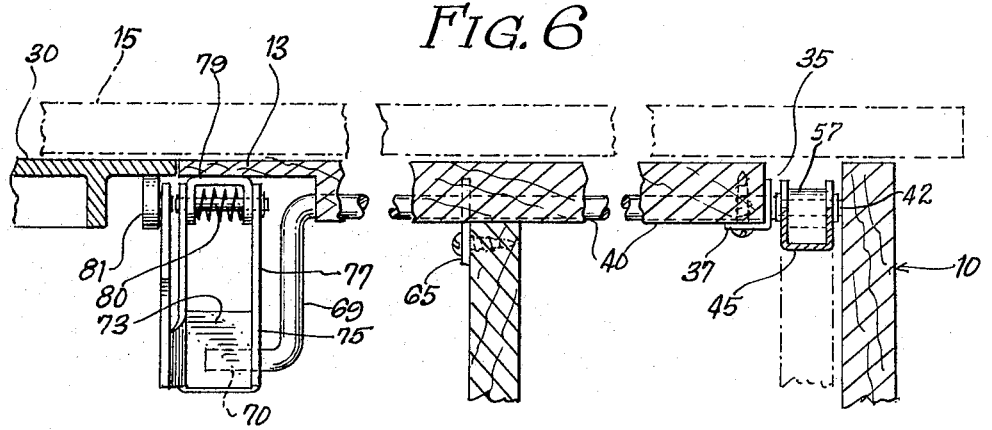

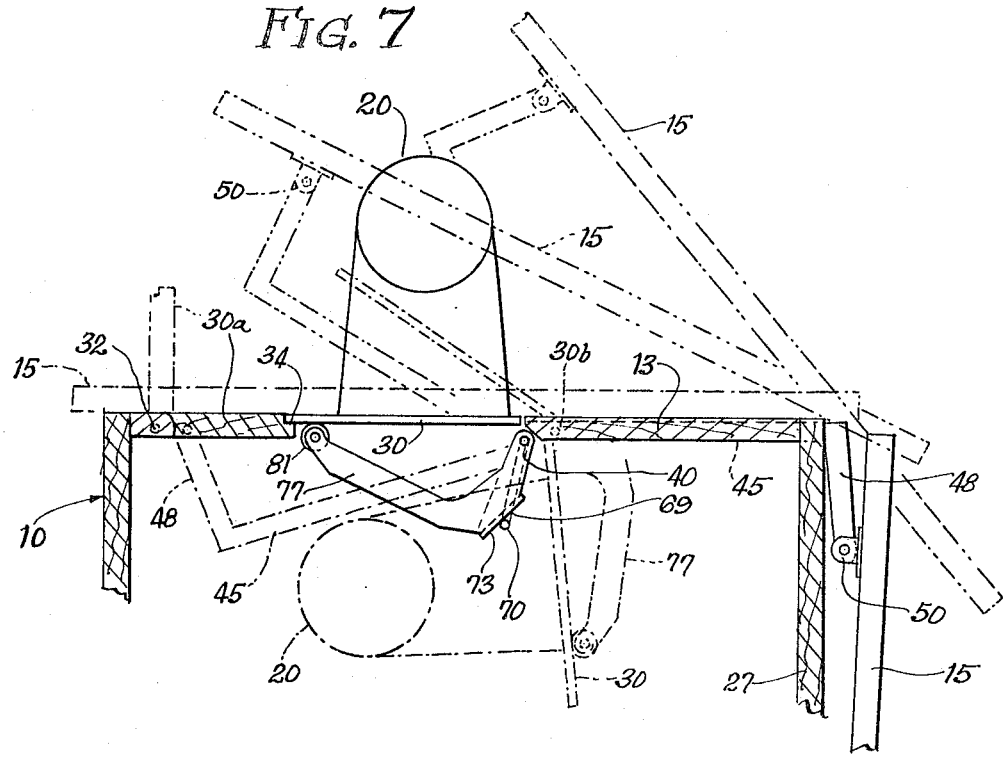
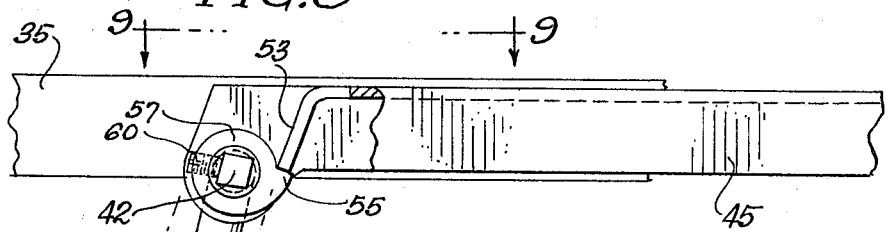
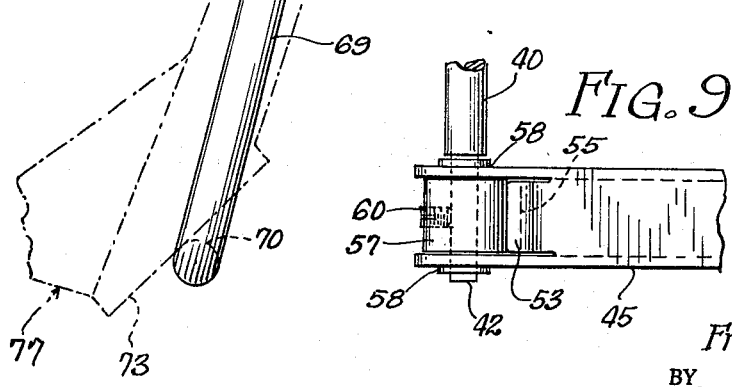

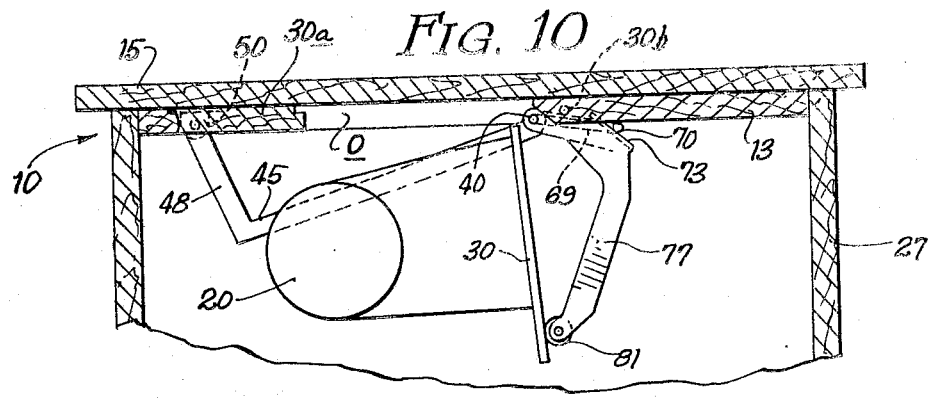
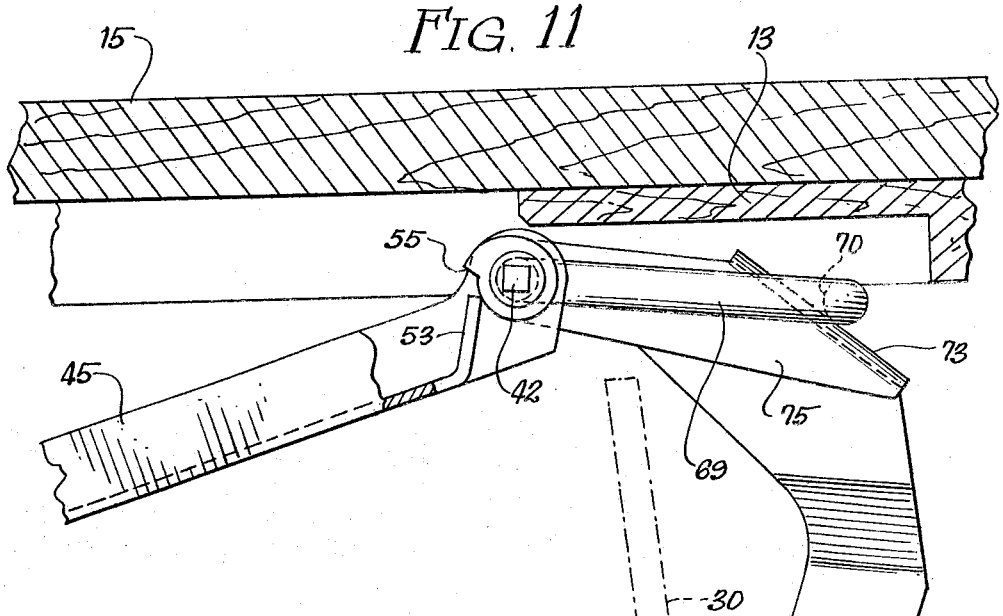
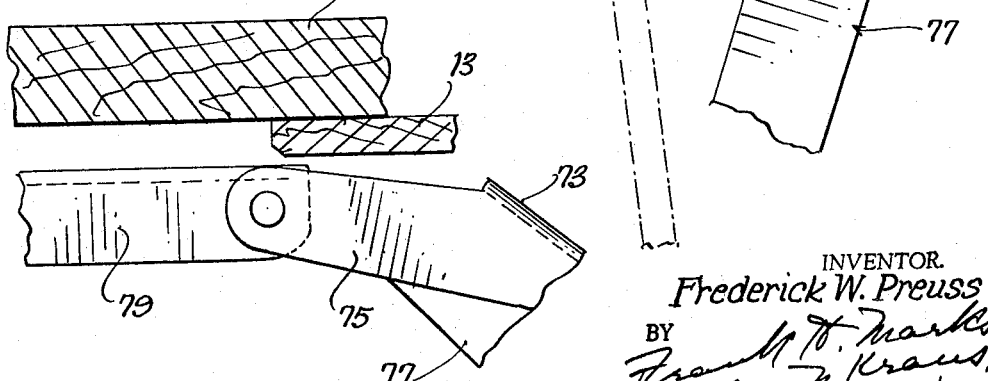

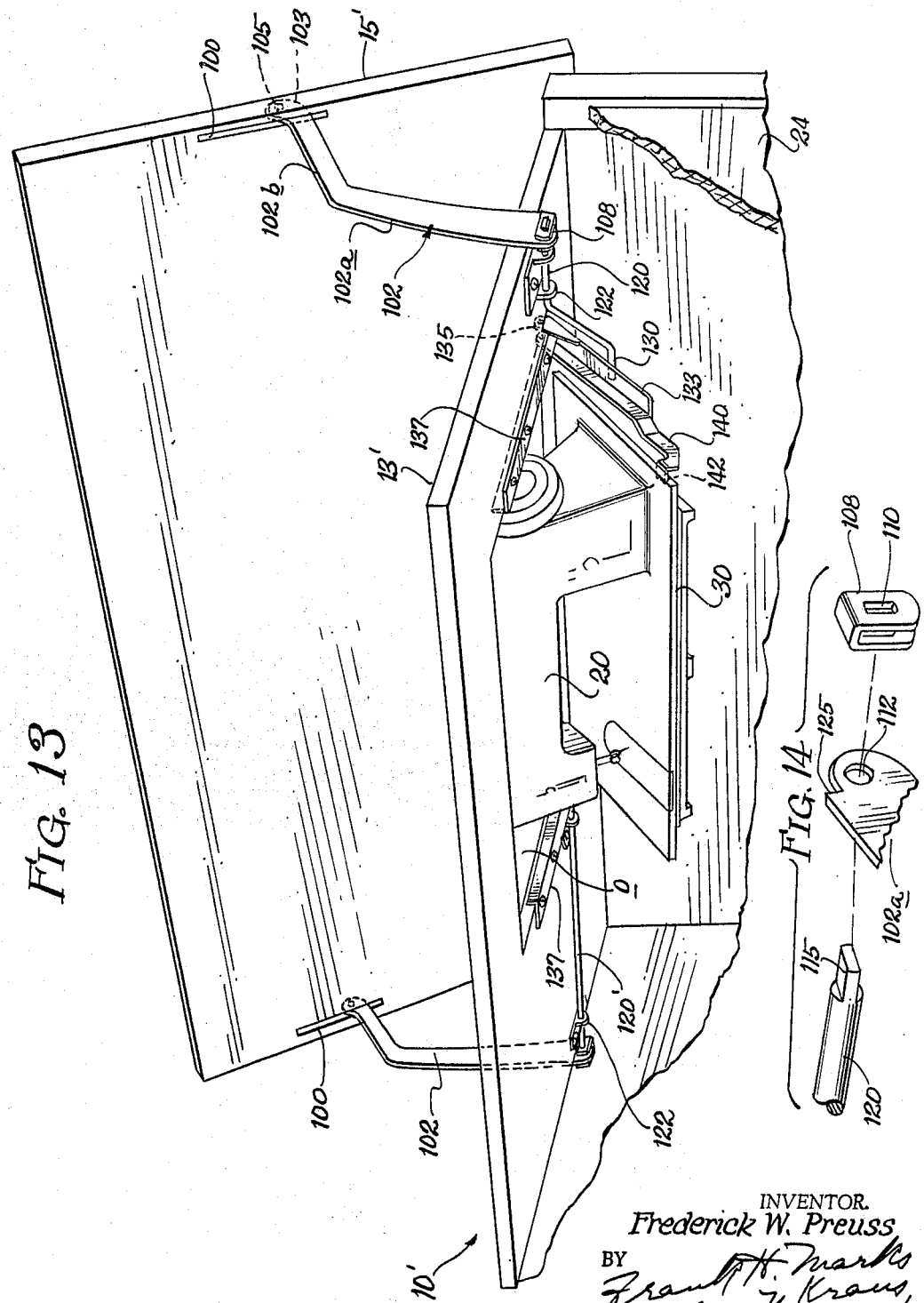

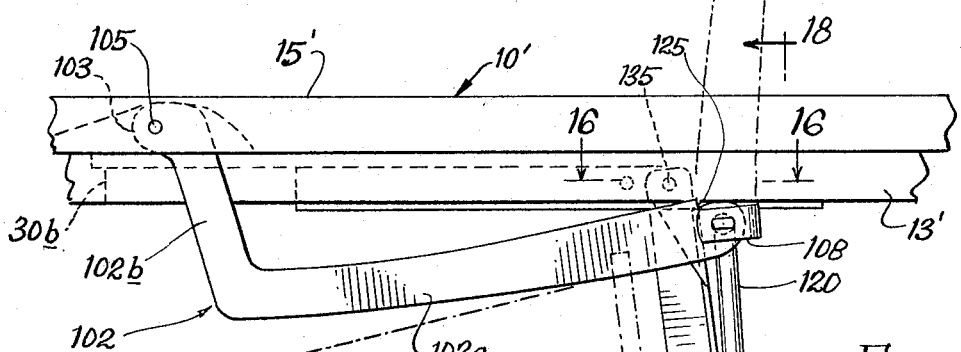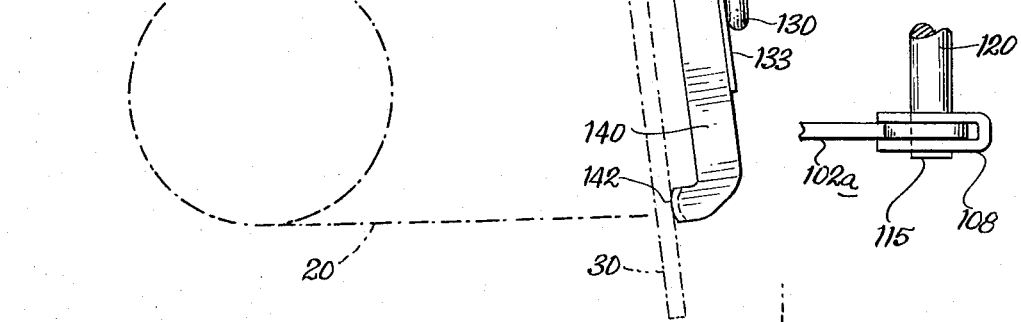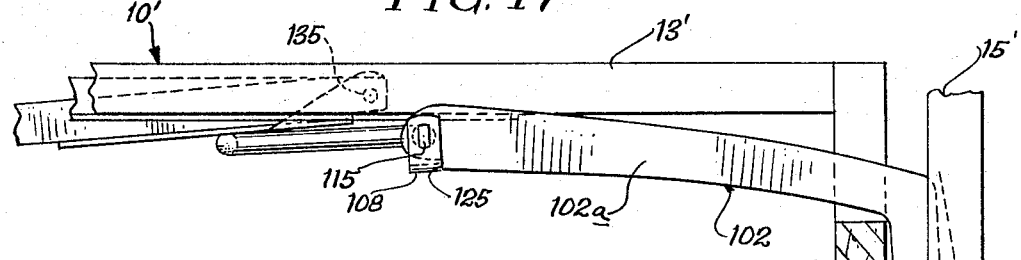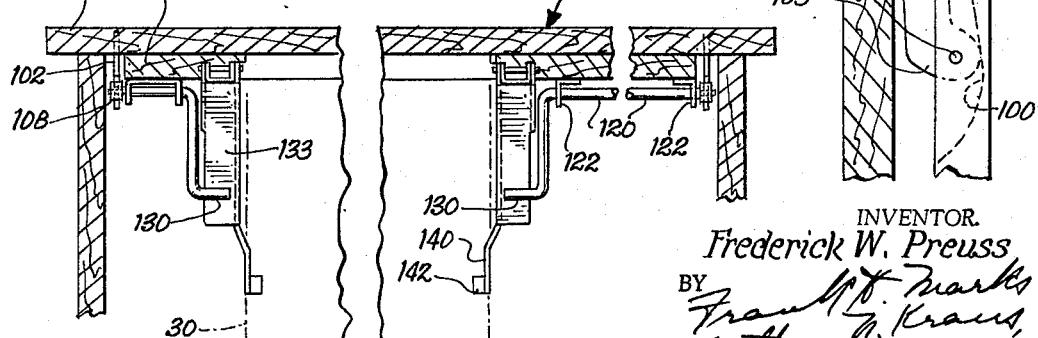

United States Patent Office 3,264,046
Patented August 2, 1966

3,264,046
APPLIANCE SUPPORTING CABINET
Frederick W. Preuss, Terry, Miss., assignor to MPI Industries, Inc., Jackson, Miss., a corporation of Illinois
Filed Oct. 31, 1963, Ser. No. 320,382
10 Claims. (Cl. 312—26)

My invention is broadly applicable to convertible furniture, and more particularly to a cabinet such as a desk, table or the like designed to serve a second function of supporting a piece of mechanism usable in the home or office, such as a sewing machine, typewriter, or other mechanism of substantial weight in such manner that, in one condition of the cabinet, the appliance will be completely out of sight, while in another condition thereof said appliance will be visible and available for operation. Hereinafter I will refer to such furniture generally as cabinets. I realize that in general such convertible cabinets are old.

In the field of domestic sewing machines, in modern times, it has been considered highly desirable by the housewife to have a console type sewing machine housed in a cabinet which will blend harmoniously with the usual living-room furniture and not be conspicuously a piece of mechanism or housing for such when not in use. The art, accordingly, has for many years known sewing machine cabinets in the form of a desk, "vanity" stand or other type of esthetically attractive cabinet. However, in most instances these cabinets have retained certain tell-tale features revealing the fact that they are primarily intended to house a machine. One give-away feature of construction has been an extra horizontal leaf or panel hingedly attached to the top of the cabinet and adapted to be rotated rearwardly to make available the drop-head machine normally disposed out of sight therebelow and adapted to be swung up into operative position after said leaf has been swung back.

A particular object of my invention is to provide a cabinet housing and supporting a piece of mechanism, especially a drop-head sewing machine, in one out-of-sight position and alternatively in an operative position, said cabinet having a single top leaf or panel. The cabinet, when the mechanism is in stored or inoperative position, will faithfully resemble an attractive piece of living room furniture with no obvious indication that it houses a machine, and can even function as such.

A further object of my invention is to provide a cabinet of the type referred to having a top panel and a mechanism normally concealed thereunder on a rotatable support, as in the case of the usual drop-head sewing machine, said panel being so connected to said support that the two parts substantially counterbalance each other, the connecting means whereby rotation of the top panel will move the mechanism out of stored position to one of access, and vice versa, operating with a minimum of manual effort and being extremely simple in construction, efficient in operation, economical to produce, and otherwise generally satisfactory.

Another object is to provide an article of the type referred to wherein said connecting means is so constructed as to permit swinging movement of the top panel upwardly and rearwardly from a horizontal position where it contributes to the appearance of a regular piece of living room furniture to a position substantially completely disposed in the rear of the cabinet and substantially concealed thereby, the path of movement of the panel being such as to require a minimum of clearance behind said cabinet, thus permitting the latter to be positioned relatively close to a wall.

Another object is to provide an article of the type referred to wherein said connecting means will include a lost-motion arrangement at the beginning and also at the end of the swinging movement of the panel from its horizontal position to its rearwardly disposed position. Thus, initial movement of the panel from its horizontal position will be free of the machine housed in the cabinet; final movement of said panel to its vertical position will serve to bring the appliance housed in the cabinet up to a position of access where it may readily be grasped and thereupon be further rotated manually independently of said connecting means, into operative position above the cabinet. Thus, it may be said that my invention contemplates a double lost-motion connection in the transmission means.

I am aware that various attempts have been made in the past to solve the problem with which I am concerned, as outlined above, as illustrated for example by United States patent to Bates et al. No. 1,139,833, disclosing a typewriting stand with a top leaf which may be swung upwardly and rearwardly into a position at the rear of the stand. However, all of said prior art attempts, so far as I am informed, have been awkward and cumbersome, involving an expensive mechanical arrangement, in contra-distinction to my invention, which is extremely simple and inexpensive, with a minimum of simple parts.

Referring now to the drawings forming a part of this specification and illustrating preferred embodiments of my invention, FIG. 1 is a front elevational view of one type of cabinet to which my invention is applicable, in this case a desk, with the machine and the connecting means concealed inside the cabinet;

FIG. 2 is a fragmentary elevational view of the same with the machine, in this case a sewing machine, in operative position and with the top panel disposed behind the cabinet;

FIG. 3 is a side elevational view of the same, with the machine in operative position, as in FIG. 2;

FIG. 4 is a top plan view of the same, with the parts in the position of FIGS. 2 and 3;

FIG. 5 is a fragmentary bottom plan view of the same, on a somewhat enlarged scale, with the machine in concealed or inoperative position;

FIG. 6 is a fragmentary front elevational view, partly in section, on a still further enlarged scale, taken substantially along line 6—6 of FIG. 5, showing a part of the mechanism connecting the top panel with the machine support, with the machine (not shown) disposed in operative position;

FIG. 7 is a sectional view taken substantially on line 7—7 of FIG. 2, partly in elevation, showing in dotted lines positions assumed by the various parts in the course of movement from inoperative to operative position of the machine;

FIG. 8 is a further enlarged fragmentary detailed view taken from the right end of FIG. 5, showing certain parts when the machine is in operative position;

FIG. 9 is a fragmentary detailed plan taken from a position along the line 9—9 of FIG. 8;

FIG. 10 is a view substantially along line 10—10 of FIG. 5, and is similar to FIG. 7, but with the parts in the positions assumed when the machine is entirely concealed;

FIG. 11 is a view similar to FIG. 8 but with the parts in position when the machine is concealed;

FIG. 12 is a fragmentary detail of certain parts seen in

FIG. 11, but with certain parts removed for added clarity;

FIG. 13 is a fragmentary perspective view of another cabinet embodying a modified form of my invention;

FIG. 14 is a fragmentary exploded perspective of certain connecting elements employed in the modification of FIG. 13;

FIG. 15 is a fragmentary side elevational view detailing certain parts of the same modification, with the movable panel in horizontal position;

FIG. 16 is a fragmentary plan view substantially along the line 16—16 of FIG. 15;

FIG. 17 is an elevational view similar to FIG. 15 but showing the movable panel disposed rearwardly of the cabinet, and FIG. 18 is a fragmentary sectional view, partly in elevation, taken substantially along the line 18—18 of FIG. 15.

Referring first to FIGS. 1–3, inclusive, I have shown my invention as applied to a cabinet 10 which, for purposes of illustration only, is shown as a desk of simple design, it being understood that my use of the word cabinet herein is intended to include generally a wide variety of articles of household or office furniture to which my invention is applicable, such articles including supporting means such as legs 12, a fixed top wall 13 and a movable top panel 15, and means such as drawers or simulated drawers 18 supported by the legs below the table top or panel 15 for the dual purpose of providing an appearance faithfully suggesting an ordinary piece of furniture such as is usually encountered in a living room, office, etc., and also for concealing a piece of mechanism, in this instance a sewing machine head 20.. A knee-hole space 22 is provided, and panel 15 disposed immediately thereabove may be a simulated drawer or a panel of ornamental design. Fixed top 13 has an opening O therein (FIG. 10).

The cabinet 10 will also include side walls 24 (FIG. 3) and a back wall 27 (FIG. 7) in the embodiment shown, for aesthetic or decorative purposes, so that, if desired, a cabinet embodying my invention may be disposed away from a wall W or in any desired position in a living room or elsewhere.

The appliance or machine, in this case a sewing machine head 20, is mounted, as by screws (not shown), on a suitable support such as a leaf 30 which is pivotally attached to fixed table top 13 by hinge plates 30b, permitting said leaf and the appliance 20 supported thereby to be rotated within an angle of slightly more than 90° from the concealed and inoperative position seen in FIG. 10 and dotted in FIG. 7 to the operative position seen in full lines in FIGS. 2, 3 and 7. Cooperating with leaf 30 is an auxiliary leaf 30a pivotally mounted in the cabinet by suitable means such as a piano hinge 32, permitting said auxiliary leaf 30a to be lifted to permit manual raising of the appliance 20 with its supporting leaf 30 from its concealed position below top 13 to operative position thereabove, whereupon auxiliary leaf 30a is dropped back to its normal position (FIG. 7), flush with fixed table top 13, and the appliance 20 is then swung back to the working position seen in full lines in FIG. 7 with leaf 30 seated within ledge 34 formed in the edge of auxiliary leaf 30a. This arrangement is commonplace in drop-head sewing machines.

Fixed table top 13 is provided with relatively narrow slots 35, 35 (FIG. 4) extending generally from front to rear thereof and preferably spaced a slight distance inwardly from the side extremities of said table top, in order to provide maximum working area on top 13. At any rate, said slots are approximately equispaced from the opening in top 13 where leaves 30 and 30a are mounted. Secured to the lower surface of the said top 13 by screws or the like adjacent said slots 35 are brackets 37, 37 journaling crank rods 40, 40 (FIG. 5). The free end of each rod 40 is squared, flattened, or otherwise deformed, as at 42 (FIG. 8).

Under slots 35 and movable therethrough I provide a pair of actuating arms 45 for transmitting motion from panel 15 to rods 40 by means hereafter described. In its preferred embodiment each arm 45 is channel shaped in cross section (FIG. 6) to provide needed stiffness and may have an angular offset 48, an end thereof being swiveled in a suitable bracket 50 secured as by screws or the like to panel 15 at a point spaced slightly from the forward end thereof, as seen in FIG. 7.

It might be noted at this point that arms 45 are not necessarily of L-formation, as shown in this preferred embodiment, but might be otherwise shaped within the spirit of my invention and still accomplish the desired function. For example, the angular portion 48 might be dispensed with and the arm 45 might be substantially straight or might be otherwise formed.

The end of each arm 45 opposite that which is connected to panel 15 is deformed to provide a tongue or detent 53 (FIGS. 8 and 9) adapted to cooperate with an offset tooth or ratchet-like member 55 formed on a cylindrical roller 57, which might be a die casting or otherwise formed, disposed between the legs of channel shaped arm 45 adjacent the extremity thereof. Thus, crank rod 40 extends through the legs of channel shaped arm 45, being capable of free rotation therein, and is secured to cylindrical member 57 as by set screw 60 or otherwise fixed thereto. Lock washers 58, 58 may be fixed on rod 40 on opposite sides of arm 45 (FIG. 9).

It will be seen that panel 15 normally rests in a horizontal position overlying fixed top 13, as seen in FIGS. 1 and 10, in which position cabinet 10 gives every appearance of an article of household or office furniture with no indication to the casual observer that it houses a piece of mechanism. However, by simple swinging movement, as seen in FIG. 7, said panel may be brought from the horizontal position to a substantially vertical position behind the cabinet, such swinging movement serving through arms 45, 45 to rotate crank rods 40, 40 and thereby to bring the machine normally housed within the cabinet from inoperative, concealed position to accessible position in a manner hereafter described. It should be noted, however, that the first movement of levers 45, through an arc of about 90°, will be free of any effect on rods 40 and parts actuated thereby; at this point, detent 53 on each arm will engage one of the teeth 55, so that final movement of arms 45 will effect rotation of rods 40. By such lost-motion connection, the machine 20 may be moved through a much shorter arc than arms 45.

As seen, for example, in FIG. 5, the means for transmitting motion from the movable table top or panel 15 to the mechanism or appliance normally concealed within the cabinet, is duplicated on opposite sides of the cabinet, so that the forces will be balanced.

The crank rods 40, 40 pass through suitable journaling plates 65 or brackets secured as by screws to parts of the cabinet below fixed table top 13, such as stringers 66, 66 extending from front to rear of the cabinet. At their inner extremities crank rods 40, 40 have an integral offset crank member 69 terminating in a stud-like projection 70. Said projections 70 each are slideably engageable with a flat bearing surface 73 constituting a web portion of a U-shaped bar 75 which in turn is integral with a bell-crank lever member 77. Said levers 77 are each pivotally mounted in a U-shaped bracket 79 secured, as by screws or the like, to the bottom of fixed table top 13 (FIGS. 5 and 6).

At its free end each lever 77 carries a bearing member such as roller 81 adapted to engage the machine-supporting leaf 30 (or a bed plate carried thereby forming a part of machine 30), for rotation about its hinge plates 30b.

It will be noted (FIG. 6) that each lever 77 is carried on a pintle 80 extending through U-shaped bracket 79 and that a torsion spring may be wound on said pintle, serving, in a manner well understood in the art, to exert pressure on lever 77 to contribute its force to equalizing the gravitational forces on panel 15, on the one hand, and machine 20 and parts attached thereto, on the other.

From what has been said, it will be understood that when panel 15 is moved from its horizontal position overlying the cabinet to its generally vertical position behind the cabinet, thus operating, as described above, to rotate rods 40, said rods, acting through cranks 69, will serve to rock levers 77 about their pivots. Said levers, acting through rollers 81, will serve to raise leaf 30 carrying machine 20 from its concealed position within the cabinet to a position readily accessible to the operator. At this point auxiliary leaf 30a may be lifted (FIG. 7) to permit manually raising the machine above the level of fixed table top 13 and the machine and supporting leaf 30 are then permitted to rock back to operative position, as seen in full lines in FIG. 7.

When it is desired to move the machine from operative position to concealed position, the steps described above, will, of course, be reversed.

By duplicating the elements transmitting motion from panel 15 to machine 20 and its supporting means, as seen in FIG. 5, and by disposing such actuating parts at substantially equispaced points on opposite sides of the machine, a good balance of forces is achieved with a minimum of resistance. Hence, very slight manual effort is required to move the parts from one position to the other and articles embodying my invention are well adapted for use by persons of little strength.

It will be seen that the motion-transmitting means, as pointed out above, permits a lost-motion effect between arms 45 and the parts actuated thereby, effective at the initial stage of movement of the panel from its horizontal position, and also including a "disconnect" at the end of the movement of said panel to a position of rest behind the cabinet, at which point the machine and its support may be manually rotated to elevated position above the cabinet and dropped back to operative position without affecting the position of panel 15.

When concealed, the machine is limited to a generally horizontal position, i.e., with its supporting leaf 30 approximately vertical, as seen dotted in FIG. 7, this being accomplished by a stop (not seen) for restricting downward rotation of the machine and leaf. Such stop may be of any suitable form attached to the cabinet and projecting into the path of leaf 30, thus yielding maximum knee-hole space and contributing not only to convenience but also appearance.

Furthermore, it will be seen that my arrangement of the actuating arms 45 relative to panel 15 and the cabinet permits rocking of the panel between its positions of rest with a minimum of clearance behind the cabinet, and also permits disposing the panel entirely behind the cabinet, as seen in FIGS. 3 and 7.

Referring now to the embodiment of FIGS. 13–18, I show here a cabinet 10' which may be generally similar in construction to cabinet 10 of the embodiment described hereabove, with a fixed table top 13' having an opening O therein and a movable table top or panel 15'. As in the first embodiment, panel 15' will normally rest on fixed top 13' in a generally horizontal plane, as seen in FIG. 15, from which it may be swung to a position in a generally vertical plane substantially completely concealed behind the cabinet, as seen in FIG. 17. As in the first embodiment, I provide a machine or appliance such as a sewing machine head 20 mounted on a suitable base or leaf 30, which is hingedly mounted to fixed table top 13' so as to be swingable through opening O, an auxiliary leaf 30a being likewise hingedly secured to the fixed top for retaining the machine in elevated position.

In this case movable panel 15' is provided with a pair of slots 100 adjacent the side edges thereof, in which slots are pivotally secured bell-crank levers 102. Said levers again are preferably formed of flat plate stock, having a relatively long arm 102a and a relatively short arm 102b, said arms making an obtuse angle with each other in this embodiment. Said short arm terminates in an offset ear 103 apertured to receive a pintle 105 passing transversely through the slot 100 for pivotally securing arm 102 therein.

The free extremity of said long arm 102a is seated within a stirrup or U-shaped clip 108 below fixed table top 13', the legs of said clip 108 having aligned eccentric-shaped apertures (in this case oblong) 110, as seen best in FIG. 14. Long leg 102a is provided with a round aperture 112 adjacent the extremity thereof, said aperture 112 registering with apertures 10 of stirrup 108. A key portion 115 on the end of crank rod 120 formed to correspond with apertures 110 of the stirrup (in this case a flat) extends through apertures 110 and 112. Crank rods 120 (one on each side of aperture O) are retained to the underside of fixed table top 13' by means of brackets 122 apertured to receive said rods. As seen best in FIG. 14, arm 102a is provided adjacent its aperture 112 with a ratchet tooth 125.

It will be seen that swinging movement of panel 15' from its normal horizontal position, as seen in FIG. 15, toward the rear of cabinet 10' will rotate the arms 102 about apertures 112 as a center. The initial stage of movement of arms 102 (about 90°) to the point where ratchet tooth 125 engages against the web portion of stirrup 108 may be considered lost motion, as no motion will be transmitted to rods 120. However, when said engagement of teeth 125 and stirrups 108 takes place, further movement of panel 15' and levers 102 will result in rotation of crank rods 120, 120' through the medium of said stirrups 108 to which said rods are keyed.

Said cranks 120 will effect raising of the machine 20 in a substantially similar manner to that described above in connection with the first embodiment. Thus, crank rod 120 is provided with an L-shaped crank terminating in a bearing member 130 which slideably engages the underside of an angle bar 133 which in turn is hingedly connected as at 135 to an angle bar 137, the latter being secured as by screws to the underside of fixed table top 13' adjacent opening O therein (FIG. 13).

Bar 133 has a projecting leg 140 with a laterally projecting finger 142 engageable with the underside of platform or leaf 30 supporting machine 20.

It will be seen that after ratchet tooth 125 engages stirrup 108, at the point of travel of lever 102 seen dotted in FIG. 15, crank 120 will be rotated by further swinging movement of panel 15', such rotation of the crank resulting in lifting of the machine through engagement of crank arm 130 with angle bar 133, the latter through offset finger 142 serving to lift leaf 30 and the machine mounted thereon.

It will be understood, of course, that while I have described the transmission means on only one side of the cabinet, it will be substantially duplicated on the opposite side of aperture O. In this embodiment it will be noted, FIG. 13, that crank 120 is substantially longer on one side of the cabinet than the corresponding element 120' on the other side, in order that a wider expanse of table top may be provided as a work surface on one side of the machine than on the other. Obviously, such proportioning will be a mater of discretion or choice in any particular embodiment of my invention.

As seen in FIG. 15, levers 102 may be rotated slightly more than 90° before any movement is transmitted to the machine; in other words, said rotation of these levers from the full line position seen in FIG. 15 to the dotted line position may be considered as lost motion. Movement of the levers through a further arc of approximately 90° to the position seen in FIG. 17 by swinging of the panel 15' will result in raising the machine into a position of access in aperture O in the fixed table top, as previously described for the other embodiment.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. A cabinet having
   (a) a fixed top with an aperture therein for passage of a machine housed in said cabinet,
   (b) a panel having a first position of rest normally overlying said top and movable therefrom to a second position of rest substantially behind and beyond the back of said cabinet,
   (c) a leaf for supporting the machine hingedly secured to said top and normally disposed below said aperture, permitting said panel directly to overlie said top, said leaf being rotatable through the aperture to a position above said top,
   (d) a lever arm pivotally attached to said panel adjacent a side thereof and disposed below said top when the panel is in said first position,
   (e) an axially-rotatable shaft secured below said top and operably connected to said arm, whereby swinging of said arm by said panel serves to rotate said shaft, and reverse rotation of the shaft reacts on said arm,
   (f) means for transmitting rotary movement of said shaft to said supporting leaf, so that movement of the panel from said first position to said second position will result in movement of said supporting leaf to a position of access adjacent said aperture,
   (g) connecting means between the leaf and the transmission means whereby, after the panel has reached said second position, said leaf may be freely rotated from said position of access to a position above said top and then reversely rotated to a position substantially flush therewith, where a machine mounted thereon will be in operative position, and
   (h) an auxiliary leaf hinged to said top and normally substantially flush therewith, where it is adapted to support said supporting leaf.

2. A combination as in claim 1, wherein said supporting leaf and a machine mounted thereon are approximately balanced by said panel and the parts actuated thereby for conveying motion to said supporting leaf.

3. A combination as in claim 1, wherein said transmission means comprises
   (a) a crank carried by said shaft adjacent said supporting leaf, and
   (b) a bearing member carried by said crank and slidably engageable with said supporting leaf for raising the latter from below the top to a position of access adjacent said aperture.

4. In a combination as in claim 3, a lost-motion connection between the arm and shaft, whereby said arm and shaft will be operatively connected only after a substantial movement of the panel toward its rearward position.

5. A combination as in claim 1, wherein the arm and shaft will be operatively disconnected until the arm has been rotated from said first position through about 90°.

6. A combination as in claim 1, wherein said arm is so connected to said shaft as to permit swinging of the panel from one position to another with a minimum of clearance behind the cabinet.

7. A combination as in claim 5, having cooperating elements on the arm and shaft, respectively, for transmitting motion from the panel to the supporting leaf for alternatively raising or lowering the latter, whereby the arm is generally horizontal when the panel is in its first position and will rotate approximately 90° in said disconnected relation and thereafter approximately another 90° until said supporting leaf has reached said position of access.

8. In a cabinet having a fixed top, a movable panel, and an article-supporting leaf hinged to said top, means for moving said panel from a first position of rest normally overlying said fixed top to a second position of rest substantially behind and beyond the back of said cabinet, and means for simultaneously transmitting motion from said panel to said leaf comprising
   (a) a lever pivoted to said panel,
   (b) an axially rotatably crank rod, and
   (c) a connecting member keyed to said rod to be rotatable therewith,
   (d) said rod being rotatably mounted under said top adjacent the connecting member, and
   (e) said lever having a detent thereon, whereby after free rotation through a substantial arc, said detent will engage said connecting member to transmit further rotation of the lever to said rod.

9. A cabinet having
   (a) a fixed top with an aperture therein for passage of a machine housed in said cabinet,
   (b) a panel having a first position of rest normally overlying said top and movable therefrom to a second position of rest substantially behind and beyond the back of said cabinet,
   (c) a leaf for supporting the machine hingedly secured to said top and normally disposed below said aperture, permitting said panel directly to overlie said top, said leaf being rotatable through the aperture to a position above said top,
   (d) a lever arm pivotally attached to said panel adjacent a side thereof and disposed below said top in a generally horizontal position of rest when the panel is in said first position,
   (e) an axially-rotatable shaft secured below said top and operably connected to said arm, whereby swinging of said arm by said panel serves to rotate said shaft, and reverse rotation of the shaft reacts on said arm,
   (f) mechanical transmission means for alternatively raising or lowering said supporting leaf by the movements of said panel, comprising a detent element on said arm cooperating with a member fixed to said shaft, said member being engageable by said detent element only after said arm has been rotated by said panel from its generally horizontal position of rest through about 90°, following which, the additional movement of said arm of approximately 90°, as said panel moves to its second position behind the cabinet, actuates said supporting leaf to a position of access adjacent to said aperture,
   (g) connecting means between the leaf and the transmission means whereby, after the panel has reached said second position, said leaf may be freely rotated manually from said position of access to a position above said top and then reversely rotated to a position substantially flush therewith, where the machine mounted thereon will be in operative position, and
   (h) an auxiliary leaf hinged to said top and normally substantially flush therewith, where it is adapted to support said supporting leaf.

10. In a cabinet having a fixed top, a movable panel, and an article-supporting leaf hinged to said top, means for moving said panel from a first position of rest normally overlying said fixed top to a second position of rest substantially behind and beyond the back of said cabinet, and means for simultaneously transmitting motion from said panel to said leaf comprising
   (a) a lever pivoted to said panel,
   (b) an axially rotatable crank rod mounted under said top and including an axially rotatable shaft having a key portion;
   (c) a stirrup mounted on said key portion for rotation with said shaft, and said lever rotatably mounted on said shaft within said stirrup, and
   (d) said lever having a detent engageable with said stirrup to rotate it and, through its keyed connection, said shaft, only after the said lever has rotated through a substantial arc free of said stirrup.

References Cited by the Examiner

UNITED STATES PATENTS

| | | | |
|---|---|---|---|
| 491,239 | 2/1893 | Conde | 312—26 |
| 503,418 | 8/1893 | Horrocks | 312—26 X |
| 1,033,575 | 7/1912 | Garavagno | 312—26 X |
| 1,057,809 | 4/1913 | Diehl | 312—24 |
| 1,139,833 | 5/1915 | Bates | 312—24 |
| 1,227,384 | 5/1917 | Cary | 312—30 |
| 2,033,642 | 5/1936 | Moore | 312—23 |
| 2,420,508 | 5/1947 | Svensson | 312—23 |
| 2,527,407 | 10/1950 | Dunn | 312—23 |
| 2,569,715 | 10/1951 | Green | 74—96 X |
| 2,712,973 | 7/1955 | James | 312—26 |
| 2,977,170 | 3/1961 | Hochman | 312—26 |

CLAUDE A. LE ROY, *Primary Examiner.*

FRANK B. SHERRY, *Examiner.*

A. FRANKEL, *Assistant Examiner.*